Patented May 29, 1934

1,960,239

UNITED STATES PATENT OFFICE 1,960,239

FLUXING COMPOSITION

Conral C. Callis and Ralph B. Derr, Oakmont, Pa., assignors to Aluminum Company of America, Pittsburgh, Pa., a corporation of Pennsylvania No Drawing. Application October 27, 1932, Serial No. 639,841

9 Claims. (Cl. 148—26)

This invention relates to the joining of metal bodies by soldering and more particularly to a flux for the soldering of metals, such as aluminum and alloys thereof.

In the past the soldering of aluminum has been, in many cases, impractical because of the difficulty of producing uniformly good soldered joints. The chief difficulty encountered has been the removal of the oxide film present on the surface of the metal to be soldered and which, unless removed, prevents good adherence between the metal and the solder. Various methods, both chemical and mechanical, have been practiced to remove the oxide and protect the surfaces from further oxidation until adherence of the solder is secured.

Removal of the oxide by chemical means has been objected to because of the tendency of the most effective of the fluxes heretofore used to attack the metal or to leave a residue on or in the joint which, when the joint was subsequently exposed to moisture, set up a highly corrosive action on either the solder forming the joint, the metal joined, or both. Other fluxes have been proposed which do not leave non-volatile and hygroscopic residues but they have been ineffective as oxide-removing agents, or have had such high melting points as to be totally unsuitable for use at ordinary soldering temperatures. The use of fluxes for the removal of oxide film has generally been preferred over mechanical means because of the relative ease of application. However, joints so formed have generally been inferior from the standpoint of permanence.

We have found a flux composed of stannous bromide and cadmium chloride to be open to few of the objections of the fluxes heretofore known. These two salts are non-hygroscopic and if mixed in proper portions have a melting point sufficiently low to be used in most soldering operations. Some mixtures of these salts are completely volatile at the soldering temperature. An increase in the stannous bromide content of the flux reduces the melting point thereof, and we have found that for many purposes a mixture of these salts in which the cadmium chloride content varies from 30 to 60 per cent by weight is preferable, although any mixture, for instance one containing 1 per cent by weight of cadmium chloride, of these two compounds can be used and the proportions are selected with reference to the melting point desired. When cadmium chloride exceeds about 70 per cent by weigth of the stannous bromide-cadmium chloride mixture, the melting point of the flux approaches a point where, for normal soldering operations, it is too high. But fluxes of high melting point find, in some instances, suitable applications, and in such cases high melting point mixtures may be used, such as, for instance, a mixture containing about 10 per cent of stannous bromide. When the flux contains other ingredients which lower the melting point of the mixture, the amount of stannous bromide present may be as small as about 1.0 per cent of the total mixture.

While a mixture of cadmium chloride and stannous bromide forms an excellent flux, for many purposes we prefer to make additions of other metal salts to effect modifications of the flux for specific applications. For example, we have found that cadmium iodide makes the most desirable addition.

The cadmium iodide may be added in quantity with good results, but because iodine salts are expensive we usually prefer to have this salt present in the flux in amounts up to about 40 per cent by weight of the total mixture. Ammonium chloride is sometimes a desirable addition for the purpose of increasing the cleansing action of the flux, also serving to decrease the melting point of the mixture. The preferred results are obtained when the ammonium chloride does not exceed 30 per cent by weight of the total flux mixture, but larger amounts may be added to produce a flux of good characteristics. It will, of course, be evident that other salts may be added to our basic flux provided that they do not destroy the essential characteristics thereof.

Mixtures of the above salts can be used with commercial solders with improved results, but if the solder composition contains lead in any substantial quantity, zinc chloride or zinc bromide (which are substantial equivalents for this purpose) or a mixture thereof may be added to produce the best results. If a joint formed by the use of the flux is to be exposed to moisture, the zinc chloride or zinc bromide addition should not exceed 20 per cent by weight of the total flux mixture as these salts, unlike the above-mentioned salts, are hygroscopic and, if present in amount more than the designated maximum, are apt to induce severe corrosive action. In the absence of such corrosive conditions, the amount added may be conveniently increased, and zinc chloride or zinc bromide, or mixtures thereof, may constitute as much as 40 per cent by weight of the total flux.

As set out in our copending application, Serial No. 639,842, filed October 27, 1932, fluorine is a highly desirable addition to fluxes of the above type and this addition is most conveniently made with the fluorine in the form of a fluoride. The total available fluorine added should not exceed 4 per cent by weight of the flux mixture.

As stated above, the additional constituents, such as, for example, those above named or mentioned, may or may not be added to the flux composed of stannous bromide and cadmium chloride, depending upon the particular characteristics desired for a specific application. For general purposes, we have found fluxes having the following composition to be very desirable:

| Constituent | Flux A per cent by weight | Flux B per cent by weight | Flux C per cent by weight | Flux D per cent by weight | Flux E per cent by weight |
|---|---|---|---|---|---|
| Stannous bromide | 28 | 70 | 5 | 49 | 10 |
| Cadmium chloride | 30 | 10 | 40 | 36 | 70 |
| Cadmium iodide | 10 | 7 | 20 | 5 | 3 |
| Ammonium chloride | 25 | 8 | 25 | 9 | 15 |
| Ammonium fluoride | 2 | 5 | 2 | .1 | 2 |
| Zinc chloride or zinc bromide | 5 | -------- | 8 | -------- | -------- |

Fluxes such as herein described may be used as such or may be mixed with vehicles, such as the one shown in our copending application, Serial No. 649,325, filed December 29, 1932, an example of which is a vehicle composed of a mixture of chlorinated diphenyl and chlorinated naphthalene and para-dichlor-benzene. These salt fluxes and this vehicle are preferably mixed together in the approximate proportions of about 4 parts of the salts to 6 parts of the vehicle. The fluxes herein described may be applied in any well known manner. They leave no corrosion-accelerating residue and do not discolor the metal. Their penetration into small cracks makes them particularly suitable for soldering connections to aluminum cable, which, previous to this invention, had not been satisfactorily soldered. It is only necessary to dip the cable in the flux mixture and then into the molten solder after which the cable will be found to have a bright, uniform coating of the solder composition on all parts of the stranding.

This invention has been described with respect to the soldering of aluminum and its alloys for which purpose it is particularly well suited, but it can be used in the soldering of other metals such as copper and its alloys. It is also effective in the joining of dissimilar metals such as aluminum to copper or brass and aluminum to iron or steel.

Various examples are given hereinabove in order that the operation of our invention may be readily comprehended, but it is to be understood that these examples are given by way of illustration only and not as limitations and that our invention may be variously embodied within the scope of the appended claims.

We claim:

1. A soldering flux containing cadmium chloride and stannous bromide.

2. A soldering flux containing cadmium chloride, stannous bromide and cadmium iodide.

3. A soldering flux containing cadmium chloride, stannous bromide and ammonium chloride.

4. A soldering flux containing cadium chloride, stannous bromide and at least one of the salts from the group consisting of zinc chloride and zinc bromide.

5. A soldering flux containing cadmium chloride, stannous bromide, cadmium iodide and ammonium chloride.

6. A soldering flux containing cadmium chloride, stannous bromide, cadmium iodide, ammonium chloride and at least one of the salts from the group consisting of zinc chloride and zinc bromide.

7. A soldering flux containing cadmium chloride, stannous bromide and cadmium iodide, the cadmium iodide being present in amount not exceeding 40 per cent by weight of the total flux mixture.

8. A soldering flux containing cadmium chloride, stannous bromide and ammonium chloride, the ammonium chloride being present in amount not exceeding 30 per cent by weight of the total flux mixture.

9. A soldering flux containing cadmium chloride, stannous bromide and an amount not exceeding 20 per cent of the weight of the total flux mixture of a material selected from the group consisting of zinc chloride and zinc bromide.

CONRAL C. CALLIS.
RALPH B. DERR.